Patented July 1, 1930

1,769,648

UNITED STATES PATENT OFFICE

FRIEDRICH RASCHIG, OF LUDWIGSHAFEN-ON-THE-RHINE, GERMANY, ASSIGNOR TO DR. F. RASCHIG, OF LUDWIGSHAFEN-ON-THE-RHINE, GERMANY, A FIRM OF BAVARIA

METHOD OF MANUFACTURING CHLORO-THYMOL

No Drawing. Application filed April 2, 1927, Serial No. 180,615, and in Germany April 29, 1926.

My invention relates to the manufacture of chloro-thymol of the formula 1-methyl-3-hydroxy-4-isopropyl-6-chloro-benzol, and more particularly to the production of chloro-thymol from chloro-metacresol.

It has been proposed heretofore to manufacture thymol by sulphonating metacresol in order to produce cresol-sulphonic acid, treating the latter with iso-propylic alcohol in presence of concentrated sulphuric acid and separating out the sulpho-group in the usual manner. In following this course, however, a by-product is formed which is of isomeric character, as regards thymol, and of a somewhat higher boiling point than the latter while its crystallizing point lies at or near 114 to 115° C.

In another known process for the formation of thymol phosphoric acid is employed as a condensing agent and also in this case an isomeric compound having a melting point of 114° C. results which sometimes forms a larger proportion of the output so as to constitute the main product.

Now, I have found that by condensing chloro-metacresol of the formula 1-methyl-3-hydroxy-6-chloro-benzol in a similar manner by means of isopropylic alcohol, almost exclusively chloro-thymol of the formula 1-methyl-3-hydroxy-4-isopropyl-6-chloro-benzol is formed and no chlorine derivatives of any other iso-propylic metacresol occur or can be found to exist in the reaction product. This matter of fact is certainly surprising viewing the state of the art as above disclosed.

Chloro-thymol of the character herein described or as formed according to my invention is known in itself. It has been first manufactured by Bocchi, see Gazetta chemica italiana, 1926, II. 463 u. C. 1907 I 38. Characteristic features thereof are the melting point of 62 to 64° C. and an immense bactericidal or antiseptic potency so that even a saturated aqueous solution thereof, though only .03 per cent of the compound are contained therein, will be of a strength sufficient for most disinfecting or germicidal purposes.

I shall now proceed to explain my improved method more in detail to enable those skilled in the art to understand how my invention may be used in certain of its preferred forms, I wish it to be understood, however, that such preferred forms are described in detail for purposes of exemplification only, and not intended as a limitation upon the scope of the appended claims as the right is reserved to modifications and variations to the full extent indicated by the general meaning of the terms in which the claims are expressed.

Example 1

I prepare first, at a temperature of 15° to 20° C., a mixture consisting of 240 parts by weight of iso-propylic alcohol and 600 parts by weight of sulphuric acid monohydrate, and I pour the mixture or cause the same to flow slowly, that is within a full hour, into 1000 parts by weight of 1-methyl-3-hydroxy-6-chloro-benzol, keeping the liquid under treatment at a temperature of 80° C. and stirring the same incessantly by means of any suitable stirring device, during the one hour time of the mixing operation. Thereupon I continue to stir the mixture for further three hours keeping the same at a temperature of 80° to 85° C. subsequently I dilute the mixture with 500 parts by weight of water and allow the same to stand over night at a temperature of 90° C.

The resulting liquid comprises two distinct layers. The one layer of oily nature containing chloro-metacresol and the desired chloro-thymol is separated from the other or aqueous layer and the oily substance is subsequently washed with water to remove all free acid whereupon the same is subjected to a fractional distillation which is to be carried out in the usual manner so as not to deserve description in detail.

The output amounts to 350 parts by weight of pure chloro-thymol and 500 parts by weight of pure chloro-metacresol which are to be returned for repeated use.

Example 2

I mix 1000 parts by weight of chloro-metacresol with 300 parts by weight of chloride of zinc and I heat the mixture to a temperature of 80° C. I then cause 500 parts by weight of iso-propylic chloride to slowly flow into the mixture within one hour keeping the temperature at 80° to 90° C.

The hydrochloric acid evolved by the reaction escapes and together therewith about 200 parts by weight of iso-propylic chloride will escape which, however, are recovered and may be again used in the next mixing operation. The resulting reaction product is washed out with water for the purpose of removing all free chloride of zinc and hydrochloric acid therefrom and the remaining product is subjected to fractional distillation.

The output amounts to 400 parts by weight of pure chloro-thymol and 500 parts by weight of pure chloro-metacresol which are returned for use in the next mixing operation.

What I claim is:

1. The method of producing chloro-thymol of the formula 1-methyl-3 hydroxy-4-isopropyl-6 chlorobenzol, which comprises treating chlorometacresol with a compound of the formula $(CH_3)_2CHX$ in which X may be halogen or hydroxy in the presence of an acidic condensing agent, and separating the chloro-thymol thus formed by condensation, from the residual chloro-metacresol.

2. The method of producing chloro-thymol of the formula 1-methyl-3-hydroxy-4-isopropyl-6-chloro benzol, which comprises treating chloro-metacresol with iso-propyl chloride in the presence of a haloid salt of the heavy metals, and separating the chloro-thymol thus formed by condensation, from the residual chloro-metacresol.

3. The method of producing chloro-thymol of the formula 1-methyl-3-hydroxy-4-isopropyl-6-chloro benzol, which comprises treating chloro-metacresol with iso-propyl chloride in the presence of chloride of zinc, and separating the chloro-thymol thus formed by condensation, from the residual chloro-metacresol.

In testimony whereof I have affixed my signature.

FRIEDRICH RASCHIG.